April 12, 1949.  B. T. FONG  2,466,801
FISH POLE HOLDING DEVICE
Filed Jan. 21, 1947  2 Sheets-Sheet 2
Fig. 2
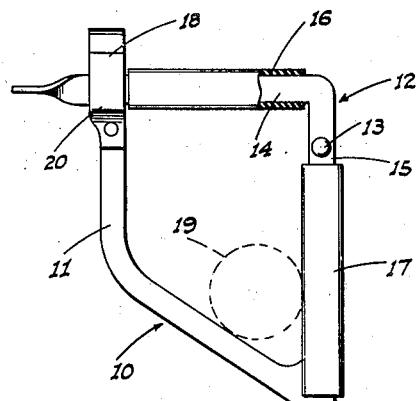
Fig. 3
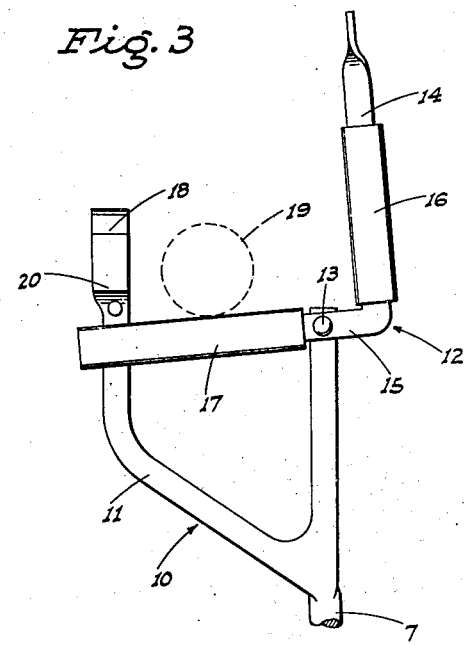
Fig. 4
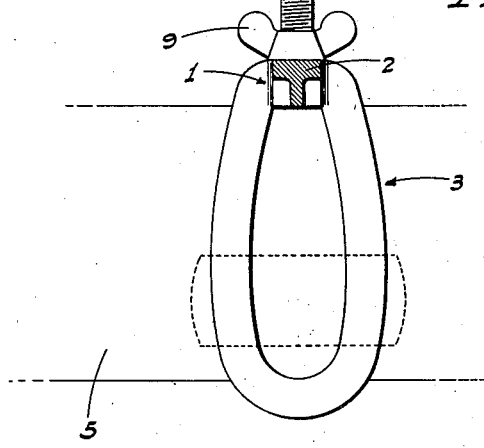
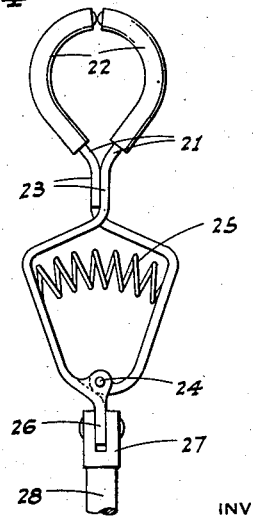
INVENTOR
Bennie T. Fong
BY
ATTORNEYS Patented Apr. 12, 1949

2,466,801

UNITED STATES PATENT OFFICE 2,466,801

FISH POLE HOLDING DEVICE

Bennie T. Fong, Lodi, Calif.

Application January 21, 1947, Serial No. 723,410

1 Claim. (Cl. 248—42)

This invention has for an object the provision of a novel fish pole holding device adapted to receive and support a fish pole whereby the fisherman does not have to constantly hold the pole, and can have his hands free without stopping fishing.

One feature of the present invention is the novel bracket arrangement whereby the device can be securely but removably attached to a boat or the like.

A further feature of the invention is the novel pole holders, which are associated with the bracket, and receive the pole in supporting relation thereto; such pole holders being designed to prevent accidental escape of the pole therefrom. The pole holders prevent loss of the pole should a heavy strike occur.

Another feature of the invention is the provision of a pole holding device which supports the pole in a stable and effective manner; this being accomplished by a pair of spaced posts upstanding from the bracket, and a pole holder on each post, the outermost holder being higher than the innermost holder so that the supported pole is disposed at an upward and outward incline as is desirable.

A further object of the invention is to provide a simple, practical, and convenient fish pole holding device, and yet one which will be exceedingly effective for the purpose for which it is designed.

These objects are accomplished by means of such structure and relative arrangement of parts as will fully appear by a perusal of the following specification and claim.

In the drawings:

Fig. 2 is a cross section on line 2—2 of Fig. 1, showing one form of pole holder in closed or operative position.

Fig. 3 is a fragmentary elevation of the same type of pole holder, but in open or pole releasing position.

Fig. 4 is a fragmentary elevation of another form of pole holder.

Figure 1:
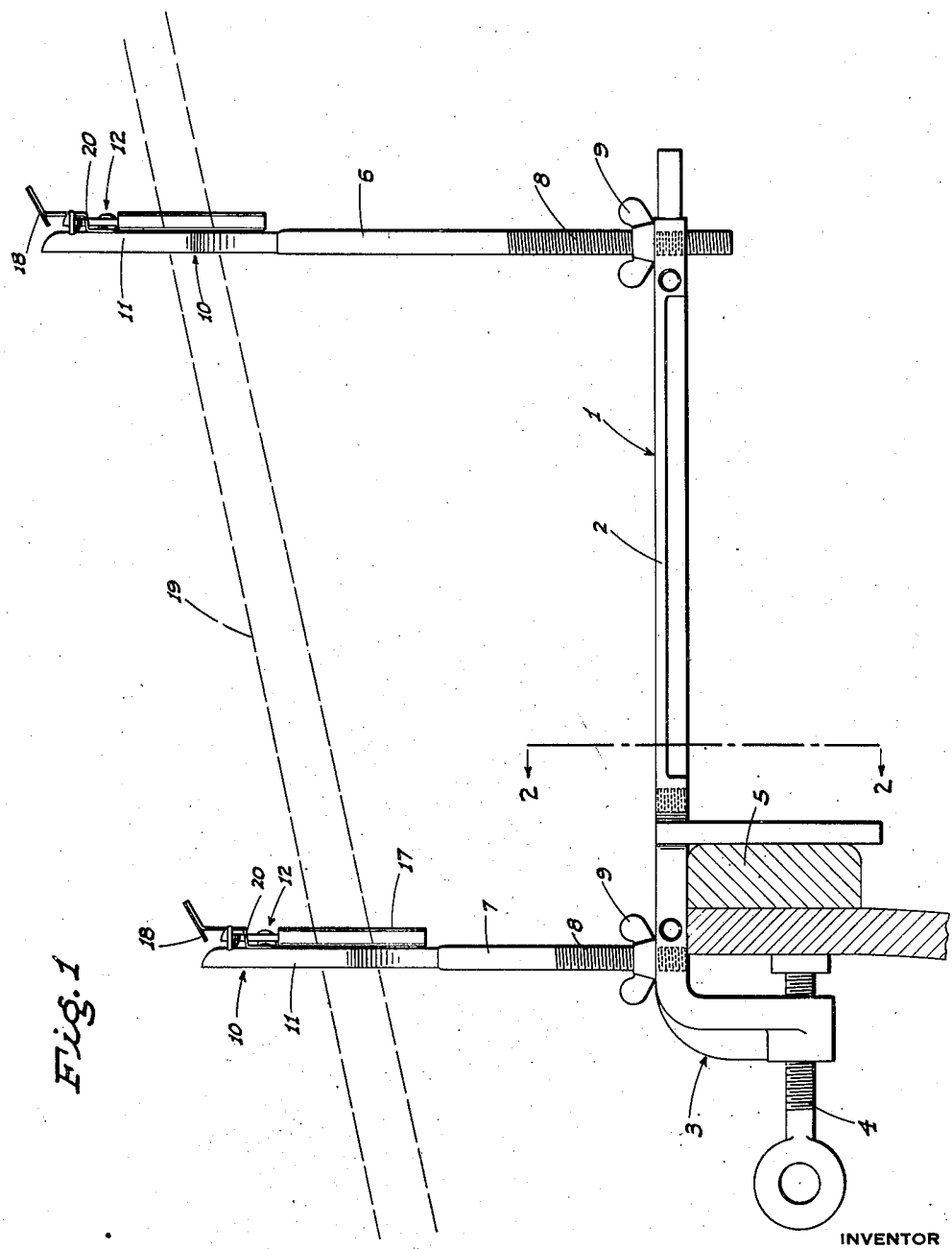
Fig. 1 is a side elevation of the fish pole holding device as mounted in connection with a boat, and in use in supporting relation to a pole.

Referring now more particularly to the characters of reference on the drawings, and at present to Figs. 1-3 inclusive, the improved fish pole holding device comprises a bracket, indicated generally at 1, which includes a horizontal arm 2 formed, at one end, with a laterally or downwardly opening C-clamp 3, which includes a hand screw 4.

The horizontal bracket 1 is adapted to be secured to a boat with the C-clamp 3 engaged over a gunwale 5 thereof; the arm 2 projecting outwardly, as shown.

Adjacent opposite ends of the arm 2, the latter is fitted with a pair of upstanding posts; the front post being indicated at 6, and the rear post being indicated at 7. The posts are threaded at their lower end portions, as at 8, and said portions threadingly engage through the arm 2 in removable relation. The posts 6 and 7 are normally secured against unscrewing by lock nuts 9, here shown of wing nut type.

The front post 6 is of somewhat greater height than the rear post 7, and at their upper ends said posts are each fitted with a pole holder, said pole holders being indicated generally at 10.

The pole holders 10, either or both, may be of the type shown in Figs. 2 and 3, or may be of the type shown in Fig. 4. For purposes of illustration both pole holders 10, in Fig. 1, are of the type showing in Figs. 2 and 3, but it is understood that the type of holder of Fig. 4 may be substituted if desired.

The pole holder shown in Figs. 2 and 3 will now be described in detail, particularly the holder on post 7.

At the upper end of said post it is formed with a laterally extending, upwardly opening fork 11, and a bellcrank latch, indicated generally at 12, is pivoted, intermediate its ends, as at 13, for swinging movement in a vertical transverse plane from a closed position with one leg 14 spanning or closing the upper end of the fork 11, to another position with said one leg upstanding and the other leg 15 spanning said fork at its upper end. The legs 14 and 15 are fitted with protective sleeves 16 and 17, respectively; these sleeves being of resilient material, such as rubber hose.

When the above fork-type, pole holder is in use, with the one leg 14 in closed position, said leg is held against release by a resilient or snap catch 18 which must be manually released before the bellcrank can be swung to its open position.

When the holder is in use the pole 19 extends through the fork 11 in supported relation, and cannot escape from said fork 11 by reason of the closed latch 12.

To remove the pole 19 from the fork 11, the catch 18 is released from the leg 14 and the bellcrank latch 12 swung from the position of Fig. 2 to the position of Fig. 3; there being a stop 20 arranged to limit opening movement of said bellcrank latch.

It will be seen that when a pole 19 is supported at longitudinally spaced points by the holders 10 of the posts 6 and 7, said pole 19 is disposed at an upward and outward incline; the holders, as closed, retaining the pole against accidental escape should a heavy strike occur. To remove the pole, for hand fishing, the latches 12 of the holders 10 are both released and swung to open position, whereupon the pole can be lifted from the supporting forks 11.

The type of pole holder shown in Fig. 4, which may be substituted for either or both of the holders 10, comprises a pair of opposed arcuate jaws 21 fitted with protector sleeves 22 of resilient material. The opposed jaws 21 include depending intersecting shanks 23 which then diverge somewhat and thence converge to pivotal connection, as at 24. A compression spring 25 between the spaced-apart portions of the shanks 23 urge the same apart, which in turn urges the jaws 21 forcefully but yieldably toward each other. At its lower end this type of holder includes an ear 26 secured in a clevis 27 on the upper end of the post 28, which corresponds to either the post 6 or post 7 of Fig. 1.

To engage this type of holder with the pole the holder is grasped below the intersecting portions of the shank 23 and squeezed together, opening the jaws 21 to permit of placement of the pole therein. Thereafter, the holder is released and the spring 25 snaps the jaws into frictional holding engagement with such pole.

When the device is not in use the posts 6 and 7 are removed from the arm 2 of the bracket 1 so that the device may be arranged compactly for storage or carrying. The bracket 1 is also intended for use as one of the cooperative parts of the sportsman's device shown in copending applications, Serial Nos. 723,408 and 723,409.

For fishing from a beach or bank, the posts 6 and 7, as detached from the bracket 1, may be projected into the earth to properly position the holders 10 in spaced apart relation.

From the foregoing description it will be readily seen that there has been produced such a device as substantially fulfills the objects of the invention, as set forth herein.

While this specification sets forth in detail the present and preferred construction of the device, still in practice such deviations from such device may be resorted to as do not form a departure from the spirit of the invention, as defined by the appended claim.

Having thus described the invention, the following is claimed as new and useful, and upon which Letters Patent are desired:

In a fish pole holding device which includes a bracket, means to secure the bracket to a fixed object and a pair of spaced upstanding posts on the bracket, a fish pole holding device on each post, each such device comprising a substantially U-shaped, upwardly facing fork, the sides of the fork being substantially parallel and one side being in substantial alinement with the adjacent post, a bell crank latch pivoted adjacent its apex to the upper end of the side of the fork which is in alinement with the post, one leg of the bell crank normally lying parallel with that side of the fork and the other leg of such bell crank extending at substantially right angles to the first leg and crossing and closing the open end of the fork, a latch means on the fork to releasably engage and hold the last named leg of the bell crank in such fork closing position, swinging of the bell crank on its pivot functioning to move the last named leg thereof from fork closing position and to simultaneously sweep the other leg across the face of the fork to a position across the open end of such fork.

BENNIE T. FONG.

REFERENCES CITED

The following references are of record in the file of this patent:

UNITED STATES PATENTS

| Number | Name | Date |
|---|---|---|
| 424,555 | Hoffman | Apr. 1, 1890 |
| 1,422,128 | Rager | July 11, 1922 |
| 1,529,265 | Merckel | Mar. 10, 1925 |
| 1,703,008 | Justice | Feb. 19, 1929 |
| 2,130,650 | Peterson | Sept. 20, 1938 |
| 2,211,278 | Le Febvre | Aug. 13, 1940 |
| 2,314,747 | White | Mar. 23, 1943 |